Figure 2:
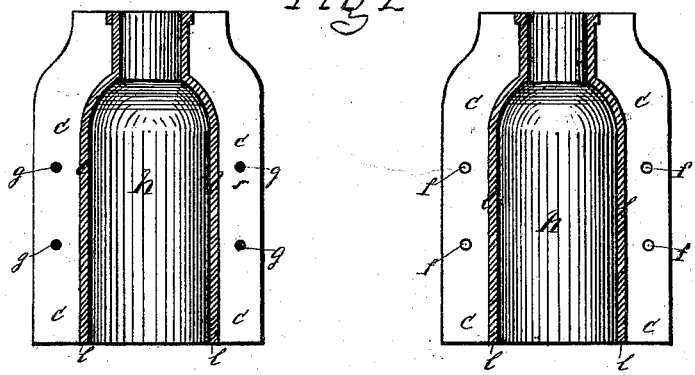

W. Culliss.

Joint Mold.

No. 98,567.  Patented Jan. 4, 1870.

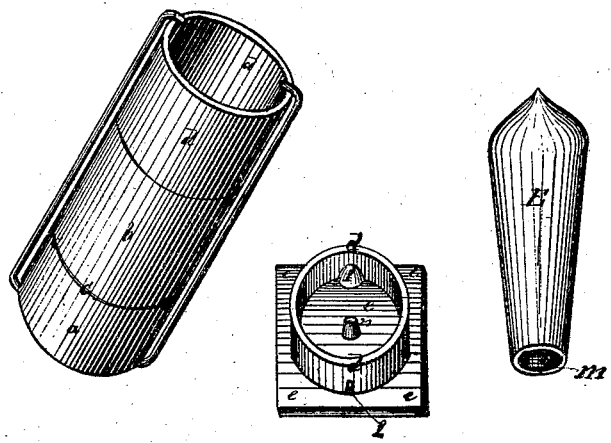

Fig. 1. Mold and parts of mold.
  A  Plane view of base.
  B  Plane view of body
  C  do   do  do  do.
  D  do   do  of cope.
  E  Perspective view of ball or mandrel.
  a  Base of mold.
  b  Body of mold.
  c  Crevice at line of joint.
  d  Cope
  e  Follow-plate.
  f  Adjusting pins
  g  Pits or cavity for adjusting pins.
  h  Surface of matrix.
  i  Broken joint.
  m  Cavity in ball or mandrel.
  n  The pin on follow-plate

Fig 1

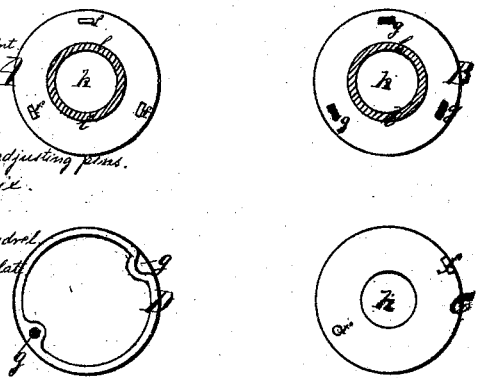

Wm. B. Culliss.
John M. Parker
  Attest

Inventor
William Culliss

W. Culliss,
Joint Mold.

No. 98,567.                Patented Jan. 4, 1870.

United States Patent Office.

WILLIAM CULLISS, OF PHILADELPHIA, PENNSYLVANIA.

Letters Patent No. 98,567, dated January 4, 1870.

IMPROVEMENT IN JOINT-MOULDS OR FLASKS.

The Schedule referred to in these Letters Patent and making part of the same.

Be it known that I, WILLIAM CULLISS, of Philadelphia city, county of Philadelphia, and State of Pennsylvania, have invented a new and useful Improvement in Moulds for Casting, by the use of which any article that can be moulded or cast from metal, can be cast or produced without a seam.

The nature of my invention consists in having the mould made of iron, and breaking it asunder along the line of each designed joint, and having the several parts of the mould so arranged, that by means of fixed adjusting-pins the several joints will fit accurately, the one with the other, forming, when closed, a smooth and perfect surface to the matrix of the mould, while the pins and irregular joint, as formed by the breaking, make a firm lock.

Planed, filed, or cut joints in moulds, no matter to what perfection art and skill may have brought them, leave in the article cast, blown, or pressed in them, a seam or blemish; but metal broken and brought together again in the exact original position of the particles, and fastened in that position, presents a surface so perfect, that when the joints of a mould are formed in this manner, they leave upon the cast or article blown or pressed, no visible trace.

This joint, while it can be applied to such a multiplicity of forms of mould, and is, necessarily, so varied in its character and application, may be fully understood by the following description, which I give so as to enable others skilled in the art to which it is applicable, to make and use my invention.

In describing its construction and operation, reference is had to the annexed drawing, making a part of this specification.

First, I form the design or pattern of the mould desired, and then proceed to mould and cast it in sand, in one piece, so arranging, with division-plates, that the metal along the line where the joint or joints are designed to be, shall be of but moderate thickness, capable of being broken by means of wedges driven into the cavity or crevices left by the division-plates mentioned.

I also cast pins of wrought-iron or similar material in the mould, so arranged as to adjust the joints and secure an equal amount of pressure upon the joint or joints and pins, when the former are closed and the mould is being used.

Figure I represents a mould for casting balls or mandrels used in welding wrought-iron flues, tubes, or pipes.

The mould proper, not including the cope $d$ and follow-plate $e$, consists of the two parts $a$ and $b$, forming, the former, the base, and the latter, the body of the mould, which are to be cast together.

$c$ represents the crevice where the division-plates are to be inserted, in making, to mark the line of the intended joint.

Figures A, B, C, and D, represent plane views of the base, body, and cope of the mould, showing, at $f$, the adjusting-pins; $g$, the pits or cavities for the same; $h$, the surface of the matrix; and $l$, the broken joint.

The parts $a$ and $b$ are cast in one piece, in sand, around a ball or mandrel, turned, cut, or ground to the exact size desired.

The pins $f$ are cast in the parts $a$ and $b$.

After $a$ and $b$ are cast, the cope $d$ is cast, separately, upon the body $h$, and the follow-plate $e$ is then cast upon the cope, so that all the parts fit each other properly.

When cold, the two parts $a$ and $b$ are broken apart, forming the joint, (my invention,) along the line $c$, where the division-plates were placed in moulding, and the ball or mandrel in the matrix falls out, by reason of the contraction of the several parts.

The pins $f$ are usually round and tapering, so as to facilitate the adjustment of the parts.

The follow-plate $e$ is a small square plate, with pins $f$, corresponding exactly with those in the upper surface of the body $b$ of the mould, and fitting the cope.

It is also provided with a larger iron pin, $n$, or print in the centre, by which a hole is made in the bed of sand, with which the cope is filled when using the mould for casting, in which a core is placed to form a cavity in the ball or mandrel when cast, as is shown at $m$, in Figure E.

When preparing the mould for use, the body $b$ is placed upon the base $a$, the joint, which is shown in Figs. A and B, at $l$, adjusting itself by means of the pins $f$. The cope is placed upon the follow-plate $h$, and filled with sand, the core inserted, and then the cope is placed upon the body $b$, and the whole clamped together, and the mould filled with the molten metal through a gate provided in the sand.

When the metal is chilled, the mould is unclamped and taken apart, the ball or mandrel cast drops out, and the mould is ready for use again.

Moulds cast or made substantially as above, will necessarily be of as many shapes and patterns as there are articles to be moulded, blown, or pressed, and while my invention is applicable to and includes all forms and varieties of moulds which can be formed in one piece, and the joint and joints of the same be made by breaking, the drawings can only represent a type, as above described.

But for further description, I add Figure II, which represents an open mould for a bottle, which is cast and operated substantially as the former, with the exception that the article produced in a mould of this character is blown or pressed, instead of cast, and I will, therefore, only describe the several parts.

*f* represents the adjusting-pins;

*g*, the pits or cavities in which the pins *f* fit;

*l* is the line of the broken joint;

*c*, the surface of the crevice, formed by the use of the division-plates; and

*h*, the surface of the matrix.

What I therefore claim as my invention, and desire to secure by Letters Patent, is—

A joint in moulds, formed by breaking asunder, along the line of the designed joint or joints, the mould first prepared or made in one piece of iron.

Also, the adjustment of the said joint or joints, by means of fixed pins, through which the pressure upon the joint or joints is relieved, as herein substantially described.

WILLIAM CULLISS.

Witnesses:
B. F. FISHER,
C. F. CLAUSEN.